(12) United States Patent
Kobayashi

(10) Patent No.: US 11,220,231 B2
(45) Date of Patent: Jan. 11, 2022

(54) SIDE AIRBAG DEVICE AND VEHICLE SEAT HAVING THE SIDE AIRBAG DEVICE

(71) Applicant: AUTOLIV DEVELOPMENT AB, Vargarda (SE)

(72) Inventor: Yuto Kobayashi, Yokohama (JP)

(73) Assignee: AUTOLIV DEVELOPMENT AB, Vargarda (SE)

(*) Notice: Subject to any disclaimer, the term of this patent is extended or adjusted under 35 U.S.C. 154(b) by 83 days.

(21) Appl. No.: 16/247,627

(22) Filed: Jan. 15, 2019

(65) Prior Publication Data
US 2019/0217807 A1 Jul. 18, 2019

(30) Foreign Application Priority Data

Jan. 15, 2018 (JP) .............................. JP2018-004290
Jan. 26, 2018 (JP) .............................. JP2018-012091
May 21, 2018 (JP) .............................. JP2018-097233

(51) Int. Cl.
*B60R 21/231* (2011.01)
*B60R 21/233* (2006.01)
*B60R 21/207* (2006.01)
*B60R 21/239* (2006.01)
*B60R 21/00* (2006.01)

(52) U.S. Cl.
CPC ...... *B60R 21/23138* (2013.01); *B60R 21/207* (2013.01); *B60R 21/233* (2013.01); *B60R 21/239* (2013.01); *B60R 2021/0006* (2013.01); *B60R 2021/2395* (2013.01); *B60R 2021/23107* (2013.01); *B60R 2021/23146* (2013.01);

(Continued)

(58) Field of Classification Search
CPC ............ B60R 21/23138; B60R 21/233; B60R 21/207; B60R 21/239; B60R 2021/23161; B60R 2021/23308; B60R 2021/23324; B60R 2021/0006; B60R 2021/23107; B60R 2021/2395; B60R 2021/23146
See application file for complete search history.

(56) References Cited

U.S. PATENT DOCUMENTS 5,556,128 A * 9/1996 Sinnhuber ......... B60R 21/23138
280/730.2
2004/0232666 A1 * 11/2004 Sato .................. B60R 21/23138
280/730.2

(Continued)

FOREIGN PATENT DOCUMENTS

JP 2009-18715 * 1/2009 ............. B60R 21/20
WO WO 2017/209192 * 12/2017 ............ B60R 21/207

*Primary Examiner* — Frank B Vanaman
(74) *Attorney, Agent, or Firm* — Stephen Olson

(57) ABSTRACT

A vehicle seat includes a seat cushion, a seat back having a side support, a frame sidewall in the side support, and a side airbag device. The side airbag device has an airbag in the side support, and an inflator for supplying a gas to the airbag. The airbag has a first chamber to be deployed toward a vehicle front side, a second chamber, and an inner vent hole at a partition between the first and second chambers. The second chamber starts to be deployed prior to the deployment of the first chamber. The gas flows from the second chamber to the first chamber via the inner vent hole. When the second chamber is deployed, at least one of an upper region or a lower region of the second chamber protrudes toward the vehicle front side than a middle region of the second chamber.

9 Claims, 13 Drawing Sheets

(52) U.S. Cl.
CPC ............... *B60R 2021/23161* (2013.01); *B60R 2021/23308* (2013.01); *B60R 2021/23324* (2013.01)

(56) References Cited

U.S. PATENT DOCUMENTS

| | | | | |
|---|---|---|---|---|
| 2005/0104342 A1* | 5/2005 | Jackson | ............ | B60R 21/23138 280/730.2 |
| 2005/0189742 A1* | 9/2005 | Kumagai | .......... | B60R 21/23138 280/730.2 |
| 2006/0103119 A1* | 5/2006 | Kurimoto | ............. | B60R 21/233 280/730.2 |
| 2006/0131847 A1* | 6/2006 | Sato | ................ | B60R 21/23138 280/730.2 |
| 2007/0138774 A1* | 6/2007 | Klima | ................. | B60R 21/207 280/730.2 |
| 2007/0164546 A1* | 7/2007 | Kai | ...................... | B60R 21/207 280/730.2 |

* cited by examiner

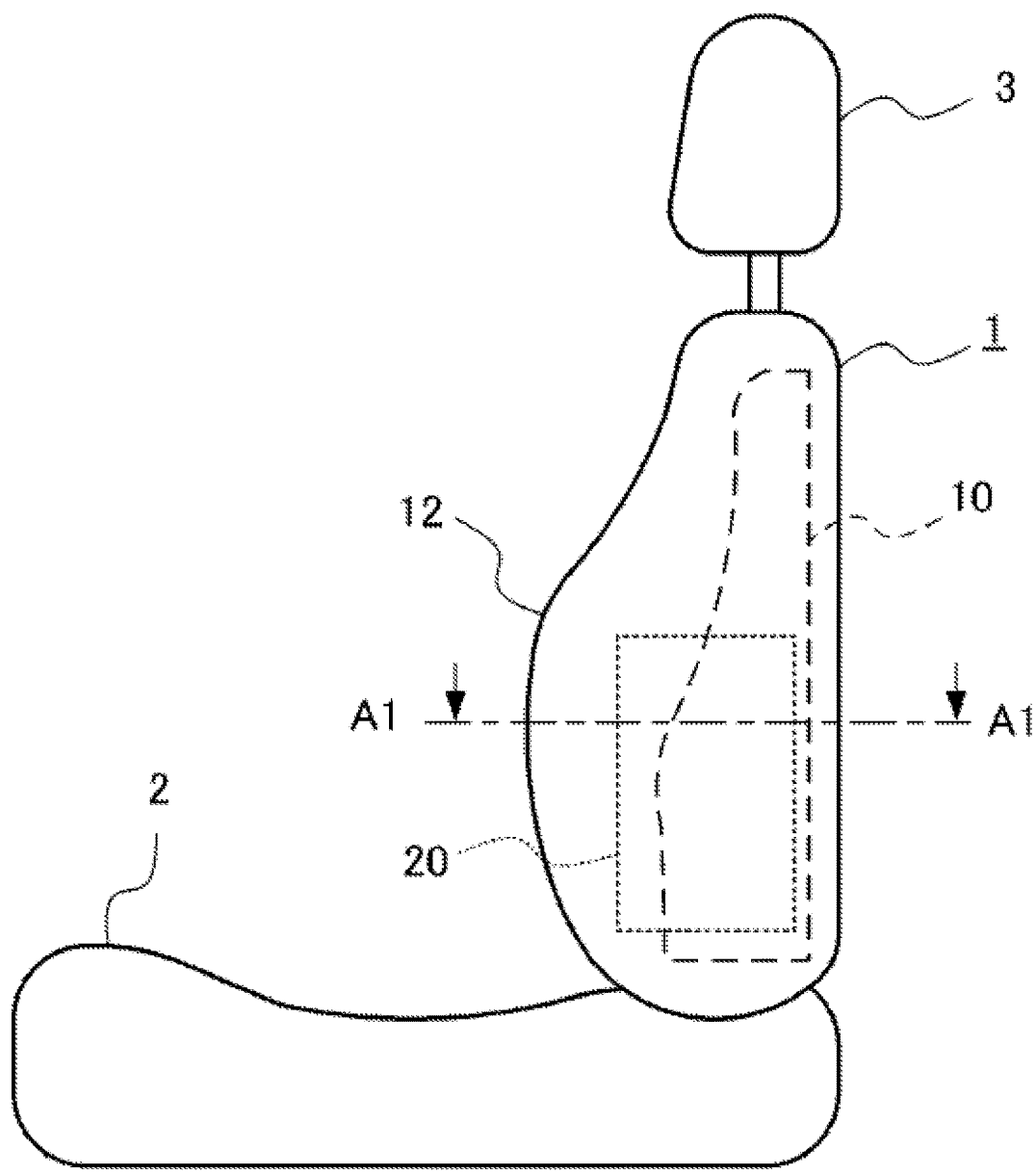
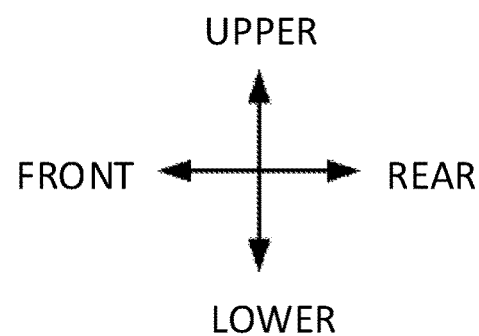
Fig. 3

A1-A1 Cross Section

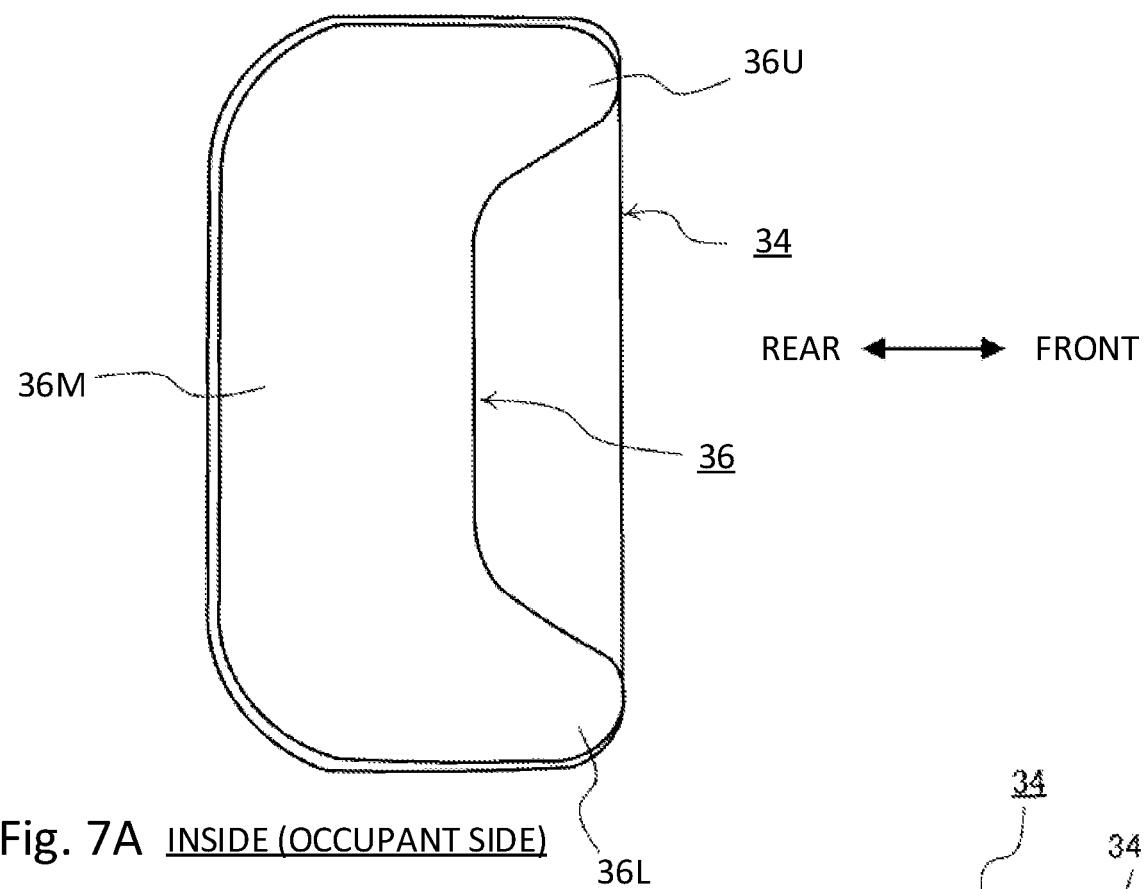
Fig. 7A  INSIDE (OCCUPANT SIDE)
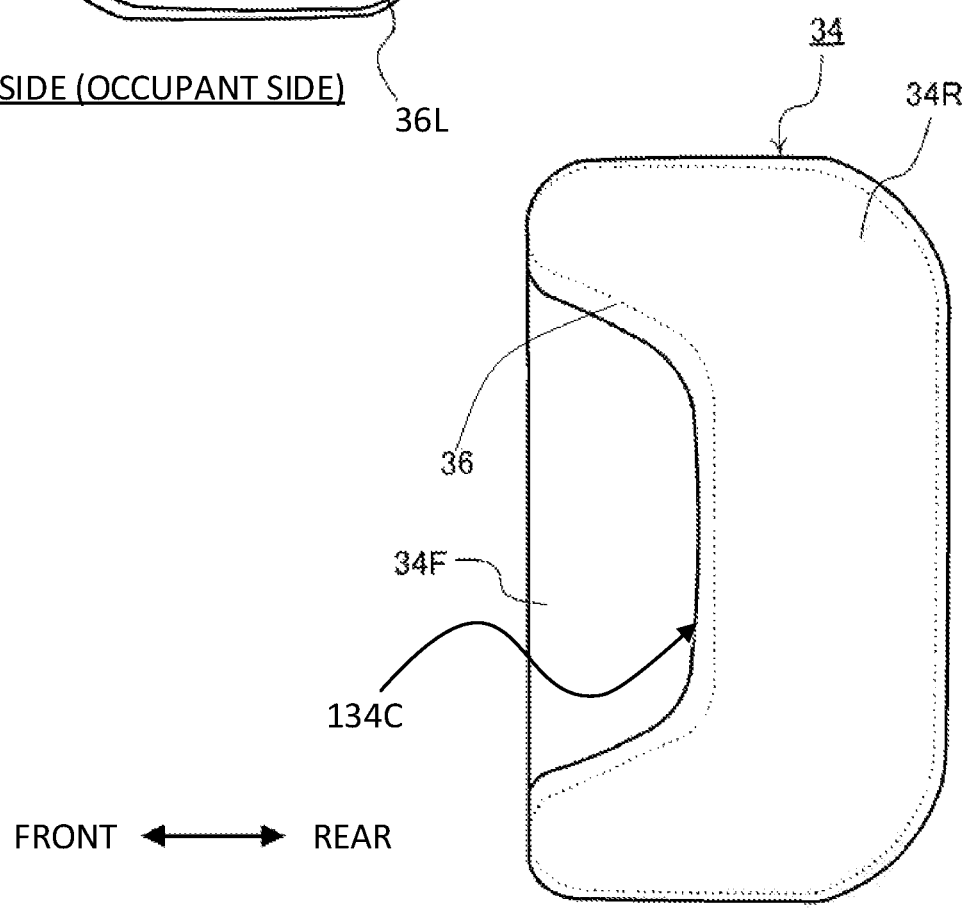
Fig. 7B  OUTSIDE

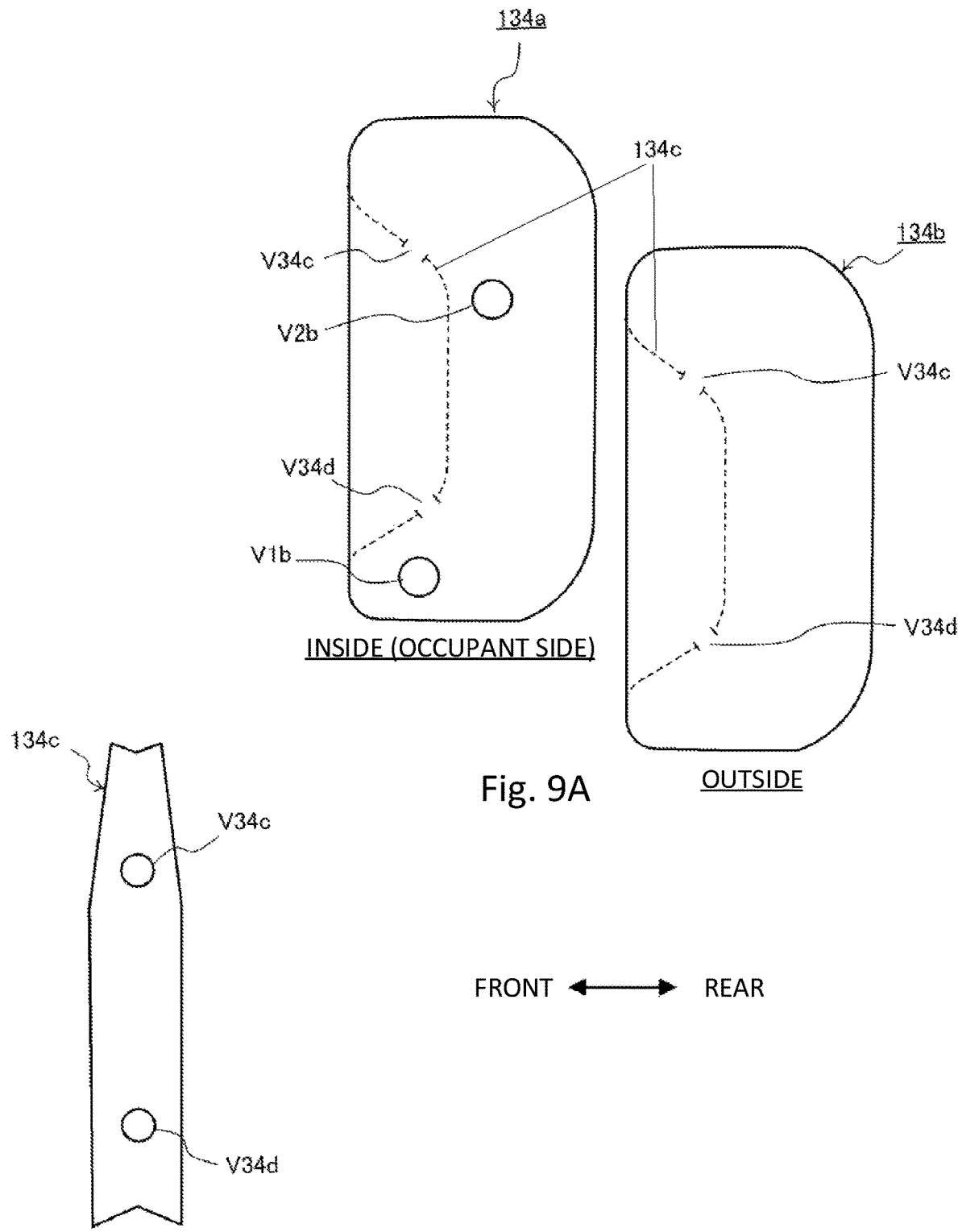

A1-A1 Cross Section

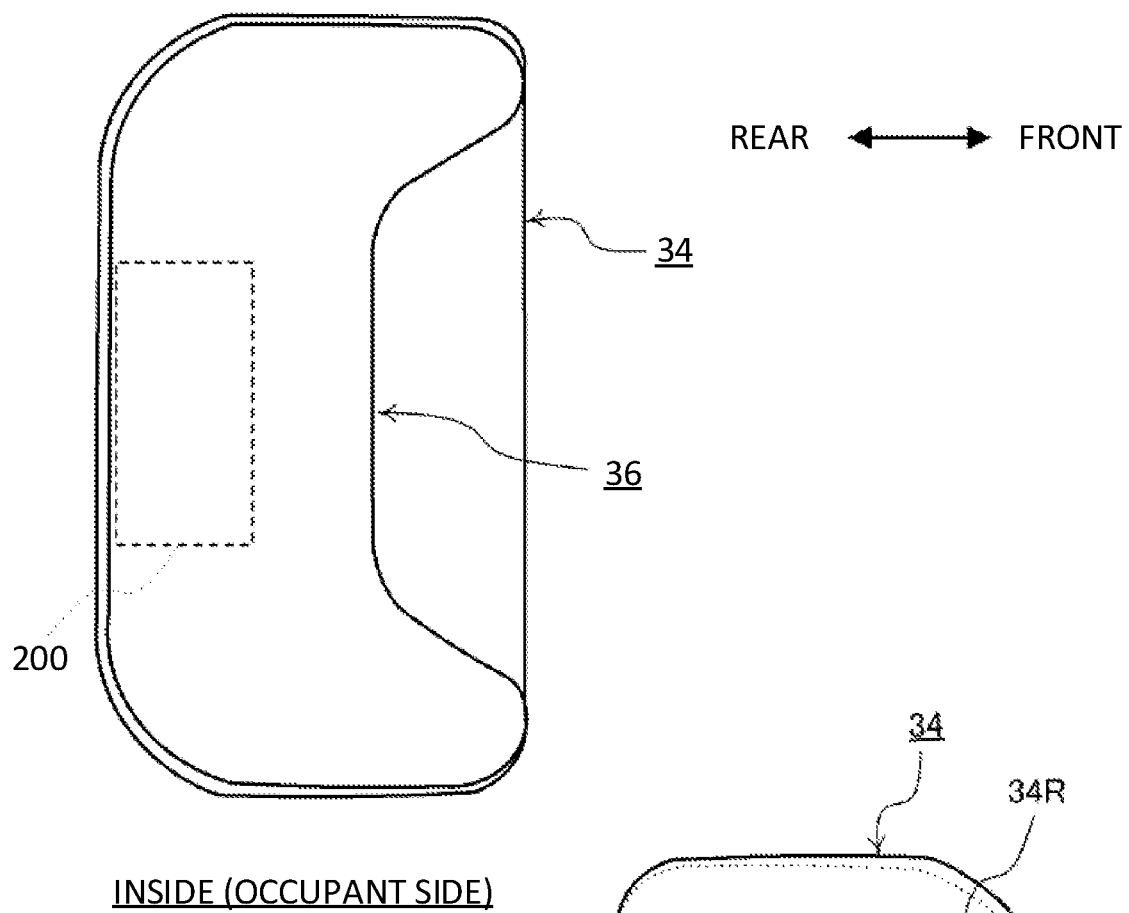
Fig. 12A  INSIDE (OCCUPANT SIDE)
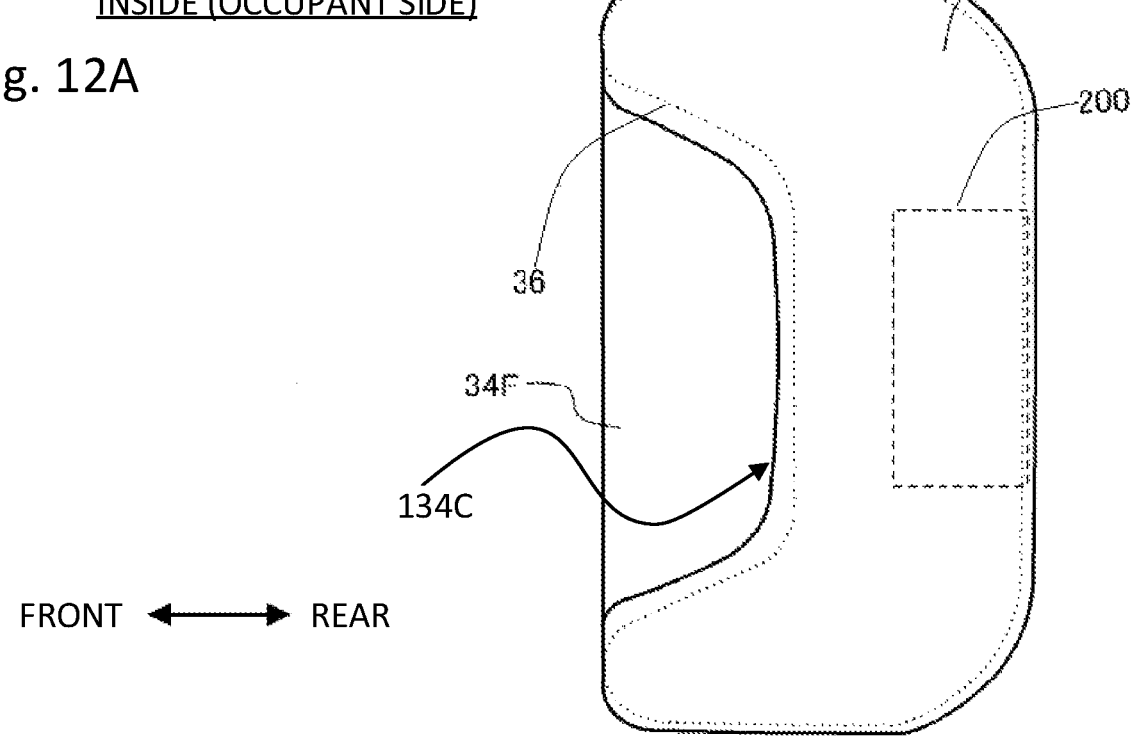
Fig. 12B  OUTSIDE

SIDE AIRBAG DEVICE AND VEHICLE SEAT HAVING THE SIDE AIRBAG DEVICE

CROSS-REFERENCE TO RELATED APPLICATION

This application claims priority to Japanese Patent Applications No. 2018-004290 filed 15 Jan. 2018; No. 2018-012091 filed 26 Jan. 2018; and No. 2018-097233 filed 21 May 2018, all of which are hereby expressly incorporated by reference herein in their entirety.

BACKGROUND

Technical Field

The present invention relates to a seat for a vehicle (a vehicle seat) in which a side airbag device is provided.

Background Art

It is well known that one or a plurality of airbags are provided in a motor vehicle in order to protect an occupant when a vehicle accident occurs. There are various types of airbags, for instance, a so-called airbag for a driver, a curtain airbag, and a side airbag. Specifically, the airbag for a driver protects the driver by being expanded proximately from a center of a steering wheel of a vehicle. The curtain airbag protects an occupant by being downwardly deployed an inward side of a window of a vehicle against the impact in a lateral direction of the vehicle, an overturn accident, or a rollover accident. Further, the side airbag is deployed between the occupant and a side panel in order to protect the occupant at the time of the impact in a lateral direction of the vehicle. The present invention relates to a side airbag device and a vehicle seat having the side airbag device.

A side airbag device described in Japanese Patent Publication Number 2009-023494 is provided with a primary airbag and an auxiliary airbag. Further, because the auxiliary airbag is expanded and deployed prior to the expansion and deployment of the primary airbag, an occupant is restrained at an early stage. In addition to the invention described in Japanese Patent Publication Number 2009-023494, a side airbag device that is provided with an auxiliary airbag in addition to a primary airbag has been proposed. In regards to the side airbag device explained above, because an installation region is largely restricted, the compactification of the device is strongly requested. Further, an improvement of a deployment speed and proper occupant protection performance based on the stabilization of the deployment behavior and deployment shape are required.

SUMMARY

The present invention attempts to solve the above problems. An object of the present invention is to provide a side airbag device that can promptly and properly restrain an occupant and a vehicle seat having the side airbag device. Further, another object of the present invention is to provide the side airbag device that contributes to the compactification of the device and the vehicle seat having the side airbag device.

In the specification and drawings, various directions are defined as described below. When an occupant sits on a seat in a normal sitting attitude so that the most part of the back of the seated occupant contacts with a seat back, a direction to which the torso of the occupant faces denotes "front" and its opposite direction denotes "rear." Further, in a direction perpendicular to the front-rear direction (longitudinal direction), a right-hand direction of the occupant denotes "right" and a left-hand direction denotes "left." In regards to the right-left direction, a region at a side of the occupant with respect to a side frame (including a frame sidewall) of the seat denotes "inside" (inner or inward side) and a region that is opposite to the occupant with respect to the side frame (including a frame sidewall) denotes "outside" (outer or outward side).

In order to achieve the above object, a vehicle seat according to one aspect of the present invention includes: a seat cushion having a seat surface; a seat back having a backrest, the seat back having a side support at a side thereof in a vehicle width direction, the side support expanding toward a vehicle front side in a vehicle travel direction; a frame sidewall disposed inside the side support, the frame sidewall extending along the vehicle travel direction in a horizontal cross sectional view; and a side airbag device having: an airbag disposed inside the side support, the airbag being configured to restrain an occupant by inflating and deploying the airbag; and an inflator provided at an inner side of the frame sidewall in the vehicle width direction, the inflator configured to supply an inflation gas to the airbag. The airbag has: a first chamber configured to be deployed toward the vehicle front side; a second chamber in which the inflator is accommodated, the second chamber is configured to start to be deployed at an inward side than the first chamber in the vehicle width direction prior to the deployment of the first chamber; and an inner vent hole disposed at a partition between the first and second chambers, the inflation gas flows from the second chamber to the first chamber via the inner vent hole. The second chamber includes upper, middle, and lower regions along a vertical direction, and the middle region is sandwiched between the upper and lower regions. Further, when the second chamber is deployed, at least one of the upper region or the lower region is configured to protrude toward the vehicle front side than the middle region.

Here, because an "upper region" can be provided, for instance, so as to include a predetermined area between an upper arm and a head or between a chest and a head of the AM50 Dummy, it becomes possible to have both the prepush function and occupant protection function. It is preferred that the "upper region" is provided so as to include a predetermined area that is capable to protect the head of the AM50 Dummy. Further, a "lower region" can be provided, for instance, so as to include a predetermined area that is capable to protect a waist of the AM50 Dummy.

In the above configuration according to one aspect of the present invention, because the second chamber is deployed inside the side support in an initial stage of the operation of the airbag device, it becomes possible that the occupant is promptly restrained while the occupant moves toward an outside in a vehicle width direction. Further, because the side support pushes the occupant toward an inside in the vehicle width direction by protruding and deforming toward a side of the occupant, the generation of a force for pushing the occupant from a back of the occupant toward a slanting front side can be avoided or can be minimally suppressed. Thus, it becomes possible that the movement of the occupant toward a direction in which the seat belt is pulled out is avoided. That is, injuriousness (dangerousness) to the occupant can be suppressed and the restraining function can be maximally performed.

Both the upper and lower regions can be configured to be deployed by protruding toward the vehicle front side than the middle region. For instance, when the second chamber is deployed, the second chamber can be in a U-shaped configuration or a C-shaped configuration in which the middle region is recessed toward a vehicle rear side when viewed from the occupant side. At this time, because the upper region of the second chamber is located proximately at (near) the head of the occupant, the head in which the damage is easily caused can be promptly restrained. Further, because the lower region is located proximately at the waist, the waist that is close to a center of gravity of the body of a human being is pushed. As a result, the restraining function for the occupant is improved in the initial stage on the occurrence of an accident.

An internal vent hole is formed in at least each of the upper and lower regions of the second chamber, and further preferably, is formed in the middle region. According to the configuration explained above, an inflation gas smoothly flows from the second chamber to the first chamber when the airbag is deployed.

It is possible that front ends of the upper and lower regions of the second chamber are configured to substantially correspond to (align with) a front end of the first chamber when the first and second chambers are deployed. In this case, there is an advantage that the deployment shape and the deployment behavior of the entire airbag including the first and second chambers become stable.

Further, it is possible that the front ends of the upper and lower regions of the second chamber are configured to be located closer to the vehicle front side than the front end of the first chamber when the first and second chambers are deployed. In this case, it becomes possible that wide areas of the head and waist of the occupant are securely restrained by the second chamber in the initial stage of the deployment of the airbag.

Further, it is possible that the front end of the first chamber is configured to be located closer to the vehicle front side than the front ends of the upper and lower regions of the second chamber when the first and second chambers are deployed. In this case, because a capacity of the second chamber becomes small, a prompt deployment of the first chamber can be promoted.

The vehicle seat further includes a rectifying member that can be located inside the second chamber to surround the inflator. The rectifying member is configured to regulate a flow of the inflation gas. Thus, the flow of the inflation gas into the second chamber can be controlled by the rectifying member. In particular, openings, which guide the inflation gas being discharged from the inflator in up-and-down directions (vertical direction), are provided at upper and lower parts of the rectifying member, the gas can be promptly supplied to the upper and lower regions of the second chamber.

The second chamber is configured by overlapping two panels that have a same configuration and sewing peripheries of the two panels together. In this case, it becomes possible to achieve the form of the upper and lower regions by a simple configuration. That is, by using two panels being shaped into the upper and lower regions in advance, the second chamber can be easily manufactured. Further, when a baffle plate, which extends in a vertical direction, is sandwiched between the front edges of the two panels, the width (thickness) of the second camber can be increased and in addition, a vent hole for exhausting the gas can be easily formed in the baffle plate. Further, the first chamber is configured by overlapping two panels that have a same configuration via a baffle plate. The baffle plate is provided proximately at a middle of the first chamber in the vehicle travel direction and extends along the vertical direction. Peripheries of the two panels are sewn together so as to section the first chamber into front and rear chambers. Thus, because the width (thickness) of the first chamber can be increased, a vent hole for exhausting the gas can be easily formed in the first chamber.

In regards to the first and second chambers, it is possible that upper and lower ends of the first chamber approximately align with upper and lower ends of the second chamber in the vertical direction, respectively. By having the shape and configuration explained above, there is an advantage that the entire airbag configuration including the first and second chambers becomes stable.

The second chamber is configured to be deployed by overlapping the frame sidewall when viewed in the vehicle width direction. In this case, the second chamber is securely deployed toward the center side of the seat while the frame sidewall receives the reaction force at the time of the deployment of the second chamber. Even after the completion of the deployment, the frame sidewall receives the pressure from the occupant. As a result, it becomes possible to securely restrain the occupant with respect to the center of the seat. On the other hand, the first chamber is configured to be deployed without overlapping the frame sidewall when viewed in the vehicle width direction. In this case, the first chamber can be promptly and smoothly deployed without the hindrance of the deployment by a side frame (including the frame sidewall) and the second chamber.

Further, the side airbag according to one aspect of the present invention includes a configuration in which a side airbag is deployed toward the vehicle center side of the seat in addition to a configuration in which a side airbag is deployed toward the door side (outward side) of the seat. The side airbag that is deployed toward the vehicle center side of the seat is referred to, for instance, as a far side airbag, a front center airbag, or a rear center airbag.

BRIEF DESCRIPTION OF THE DRAWINGS

FIG. 3 is a schematic side view of a vehicle seat according to an embodiment of the present invention and shows a state in which an airbag device is housed when observed from an outside in a vehicle width direction.

FIG. 4 corresponds to a part of a cross section along the A1-A1 direction shown in FIG. 3.

FIG. 6B corresponds to a cross section along the A2-A2 direction shown in FIG. 5A. FIG. 6C corresponds to a cross section along the A3-A3 direction shown in FIG. 5A.

FIGS. 7A and 7B are plane views that respectively show a state prior to a compression of an airbag being used for a side airbag device according to the first embodiment of the present invention. FIG. 7A corresponds to the plane view when viewed from an inside (the occupant side). FIG. 7B corresponds to the plane view when viewed from an outside (an opposite side of the occupant).

FIGS. 9A and 9B are plane views that show panel structures. The panel structures configure a first chamber of an airbag being used for a side airbag device according to the first embodiment of the present invention.

FIG. 10A corresponds to a state in an initial stage of the deployment. FIG. 10B corresponds to a state in a late stage of the development.

FIG. 11 corresponds to a cross section along the A1-A1 direction shown in FIG. 5A.

FIGS. 12A and 12B are plane views that respectively show a state prior to a compression of the airbag being used for a side airbag device according to the second embodiment of the present invention. FIG. 12A corresponds to the plane view when viewed from an inside (the occupant side). FIG. 12B corresponds to the plane view when viewed from an outside (an opposite side of the occupant).

DESCRIPTION OF EXEMPLARY EMBODIMENTS

A vehicle seat in which a side airbag device is mounted according to embodiments of the present invention will be explained with reference to the drawings below. Note that when an occupant sits on a seat in a normal sitting attitude so that the most part of the back of the seated occupant contacts with a seat back, a direction to which the torso of the occupant faces denotes "front" and its opposite direction denotes "rear." Further, in a direction perpendicular to the front-rear direction (longitudinal direction), a right-hand direction of the occupant denotes "right" and a left-hand direction denotes "left." In regards to the right-left direction, a region at a side of the occupant with respect to a side frame (including a frame sidewall) of the seat denotes "inside" (inner or inward side) and a region that is opposite to the occupant with respect to the side frame (including a frame sidewall) denotes "outside" (outer or outward side).

Figure 1:
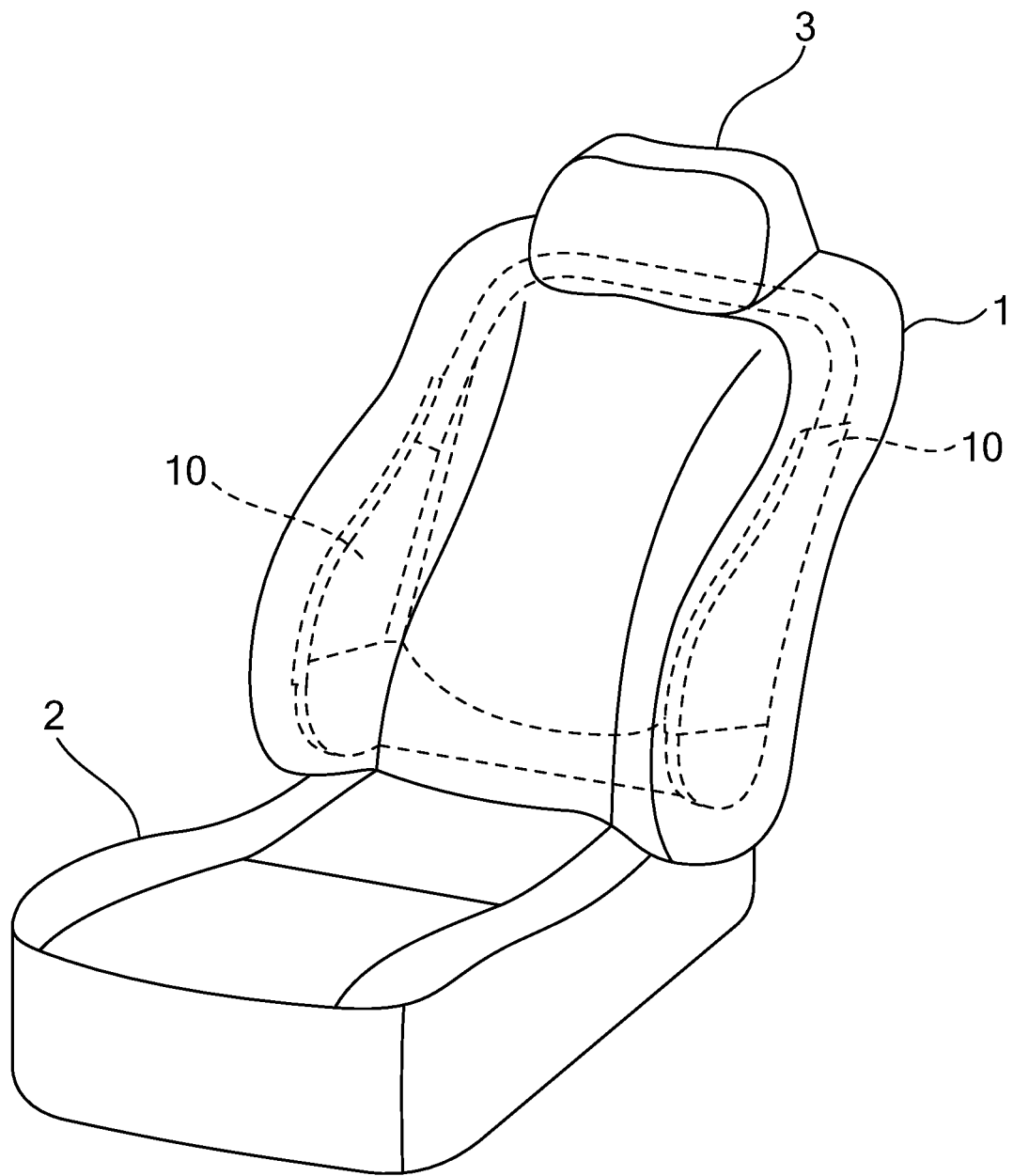
FIG. 1 is a perspective view that mainly shows an external shape of a vehicle seat according to an embodiment of the present invention. An illustration of an airbag unit is omitted from the drawing.
Figure 2:
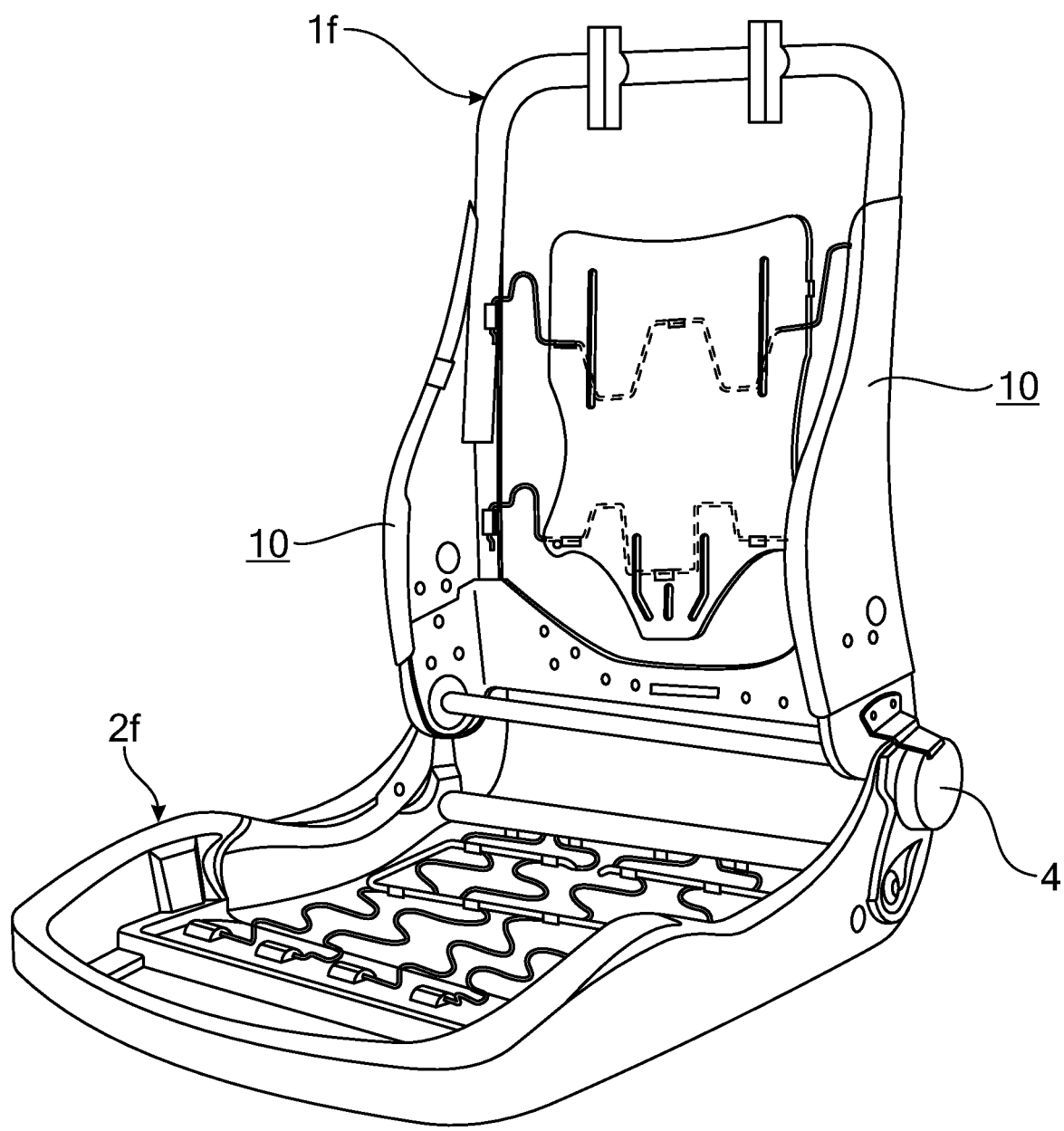
FIG. 2 is a perspective view that shows an internal structure (a seat frame) that works as a framework of the vehicle seat shown in FIG. 1. An illustration of the airbag unit is omitted from the drawing.

FIG. 1 is a perspective view that mainly shows an external shape of a vehicle seat according to an embodiment of the present invention. But, an illustration of an airbag device 20 (See FIG. 3) is omitted from FIG. 1. FIG. 2 is a perspective view that shows an internal structure (a seat frame) that works as a framework of the vehicle seat shown in FIG. 1. But, an illustration of an airbag device 20 (See FIG. 3) is omitted from FIG. 2. FIG. 3 is a schematic side view of a vehicle seat according to an embodiment of the present invention and shows a state in which an airbag device 20 is housed on a side (a near side) that is close to a door of the vehicle seat when observed from an outside in a vehicle width direction.

The present invention relates to a vehicle seat that includes a seat for a vehicle and a side airbag 20 that is housed in the seat for the vehicle. As shown in FIGS. 1 and 2, when specifically viewed as parts, the vehicle seat according to the present embodiment includes a seat cushion 2 on which an occupant sits, a seat back 1 that includes a backrest, and a headrest 3 that is connected to an upper end of the seat back 1.

A seat back frame 1f that forms a framework of the seat is provided inside the seat back 1. A pad that is composed of such as a urethane forming material is provided on the surface and the circumference of the seat back frame 1f. Further, the surface of the pad is covered by a seat cover 14 such as leather or fabric. A seating frame 2f is provided on the bottom side of the seat cushion 2. The pad that is composed of such as the urethane forming material is provided on the upper surface and the circumference of the seating frame 2f. Further, the surface of the pad is covered by the seat cover 14 (See FIG. 4) such as the leather or the fabric. The seating frame 2f and the seat back frame 1f are connected via a reclining mechanism 4.

As shown in FIG. 2, the seat back frame 1f includes side frames 10, an upper frame, and a lower frame in a frame shape. Specifically, the side frames 10 are separately positioned at the right and left sides and extend in a vertical direction. The upper frame connects the upper ends of the side frames 10. Further, the lower frame connects the lower ends of the side frames 10. The headrest 3 is configured by being provided with a cushion member at an outside of a headrest frame.

Figure 4:
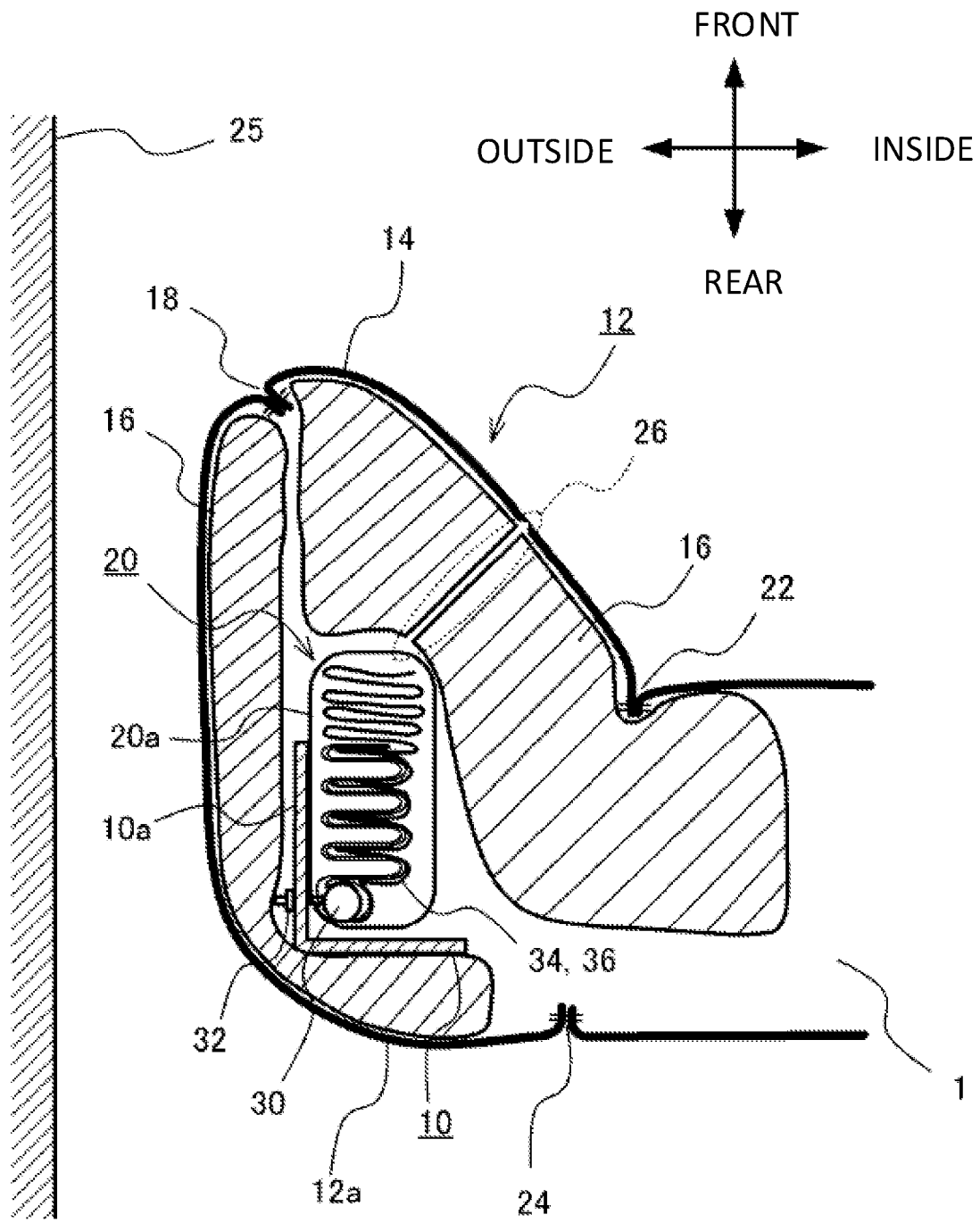
FIG. 4 is a cross-sectional view that shows a structure of a vehicle seat according to an embodiment of the present invention.

FIG. 4 is a cross sectional view that shows a structure of the vehicle seat according to an embodiment of the present invention. FIG. 4 corresponds to a part of a cross section along the A1-A1 direction shown in FIG. 3. The side frame 10 is formed with (molded of) a resin or a metal and can be in an L-shaped sectional shape or a U-shaped sectional shape as shown in FIG. 4. The side frame 10 has a frame sidewall portion 10a extending along a vehicle advancing (travel) direction when a horizontal section thereof is viewed from an upper side. Further, an airbag module (a side airbag device) 20 is fixed to an inside (a seat center side) of the frame sidewall portion 10a.

As shown in FIG. 4, the seat back 1 has a side support part 12 that expands in the vehicle advancing direction (toward a vehicle front side) at a side part (end part) in a vehicle width direction. The side airbag device 20 is housed in a space in which a urethane pad 16 is not provided inside the side support part 12. The side airbag device 20 includes airbags 34 and 36 that restrain an occupant by the expansion and the deployment and an inflator 30 that supplies an inflation gas to the airbags 34 and 36.

Each of seams 18, 22, and 24 of the seat cover 14 of the seat back 1 is connected by being folded inwardly and sewn. Further, the seam 18 located at the vehicle front side is torn and open when the airbag is deployed. Further, a starting point (bending origin) region 26 is formed in the side support part 12. Specifically, the starting point (bending origin) region 26 is to be a starting point (bending origin) when the side support part 12 is bent toward the occupant by the expansion of a second chamber 36 (refer to FIGS. 5A-5B, 6A-6C, and 10). The starting point region 26 is configured with any one or any combination of a cut, a recessed part, or a thin area. The starting point region 26 can also be formed only at the urethane pad 16 inside the side support part 12. Further, the starting point region 26 can also be omitted.

The airbags 34 and 36 are covered by a flexible cover 20a that is made from the fabric. With respect to a relationship between a first chamber 34 and the second chamber 36, the airbags 34 and 36 may suitably adopt an optimum compression method in addition to being folded in bellows or being rolled ("folded" includes rolling). In FIG. 4, a reference numeral 25 corresponds to a door trim. Though a detailed illustration is omitted from the drawings, when the airbags 34 and 36 are in a housed state in which the airbags are folded, panels for the first and second chambers are integrally folded after they are overlapped each other in a plane state by being flatly spread out in order to hold a positional relation therebetween at the time of the expansion and the deployment thereof. When the panels for the second chamber and the panels for the first chamber are individually folded, the folded second chamber can be positioned closer to the inflator than the folded first chamber. Alternatively, the folded second chamber can also be positioned between the folded first chamber and the side frame. That is, the folded second chamber can be positioned closer to a side of the occupant relative to the folded first chamber.

Figure 5A:
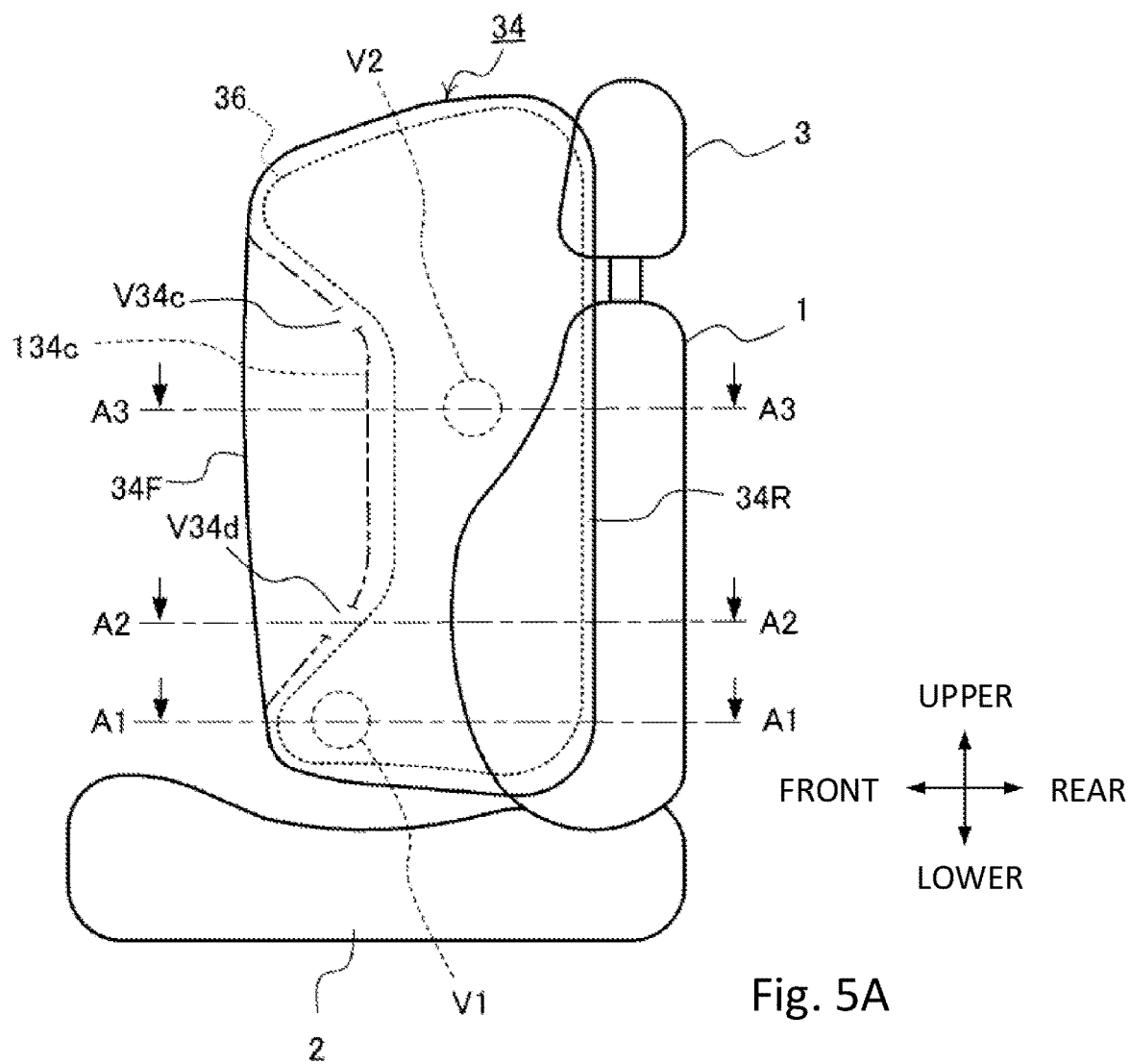
FIG. 5A is a schematic side view of a vehicle seat according to an embodiment of the present invention and shows a state in which an airbag is deployed when observed from an outside (an opposite side of an occupant) in a vehicle width direction.
Figure 5B:
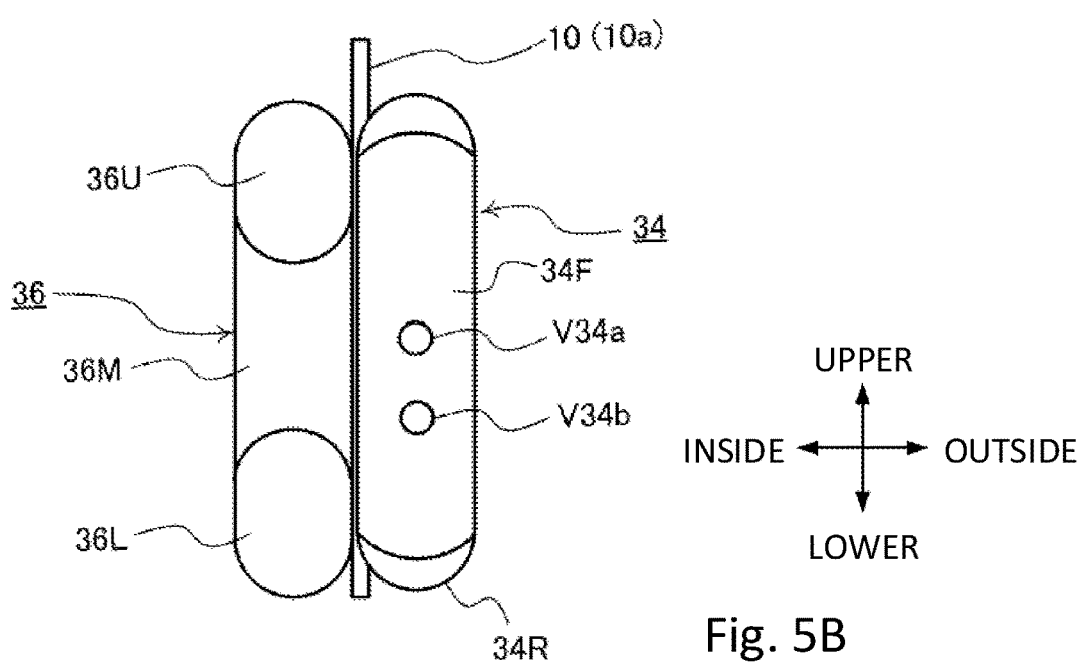
FIG. 5B is a front view that shows a deploying state of the airbag when viewed from a vehicle front side to a vehicle rear side in a vehicle advancing (advance) direction (vehicle travel direction).
Figure 6A:
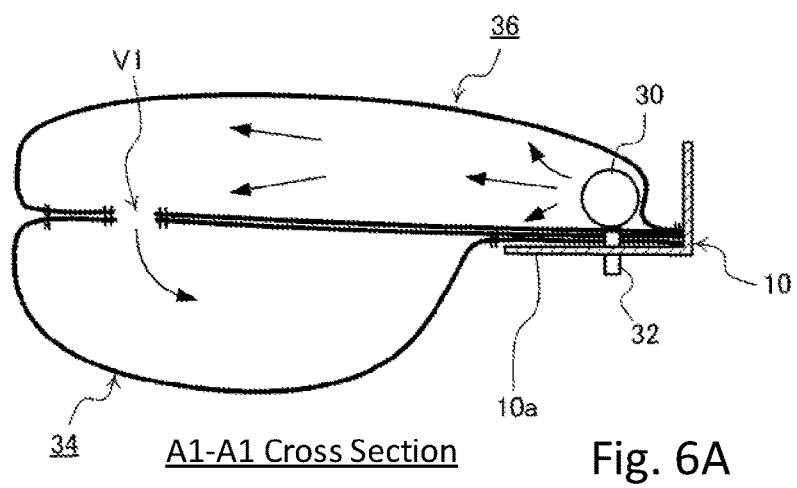
FIGS. 6A-6C are cross-sectional views that show structures of an airbag device according to a first embodiment of the present invention. Specifically, FIG. 6A corresponds to a cross section along the A1-A1 direction shown in FIG. 5A.
Figure 6B:
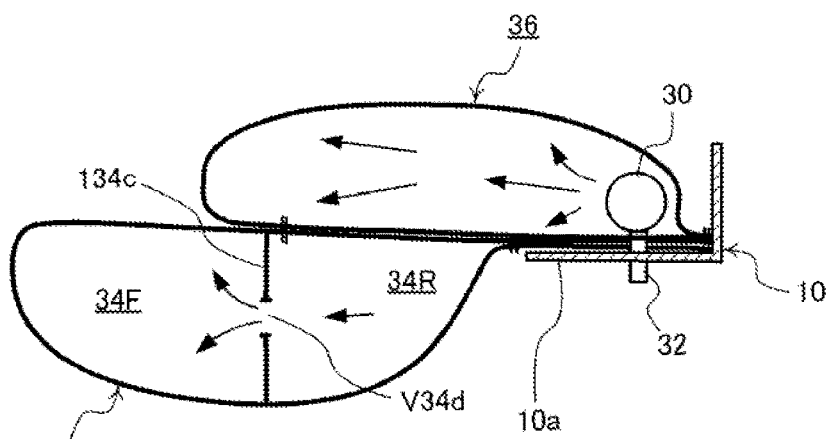
Figure 6C:
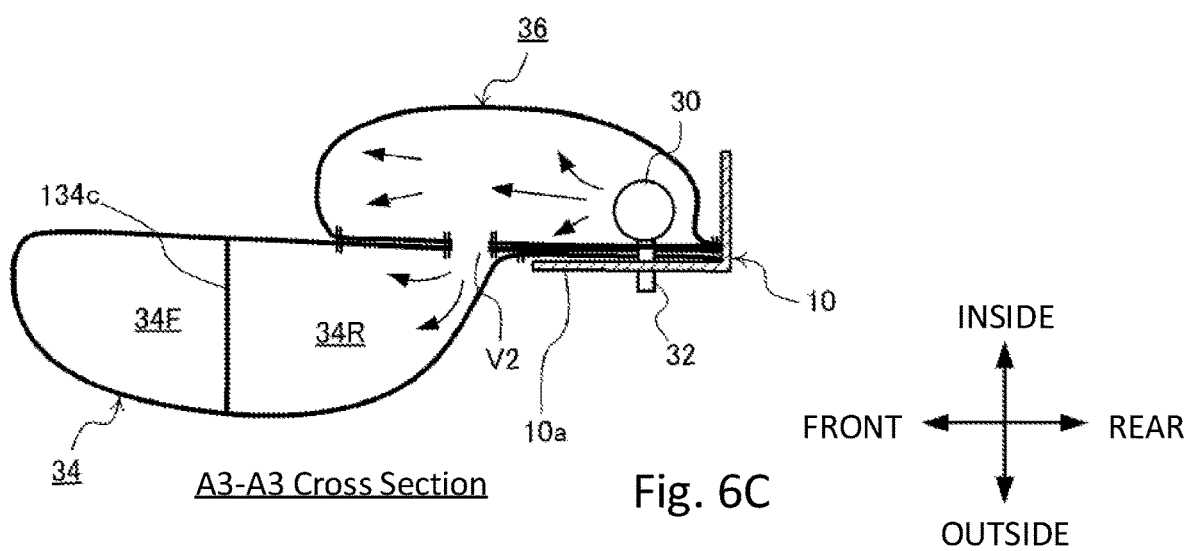

FIG. 5A is a schematic side view of the vehicle seat according to the embodiment of the present invention and shows a state in which the airbags 34 and 36 are deployed when observed from an outside (an opposite side of an occupant) in a vehicle width direction. FIG. 5B is a front view that shows a deploying state of the airbags 34 and 36 when viewed from the vehicle front side to the vehicle rear side in the vehicle advancing direction. FIGS. 6A-6C are cross-sectional views that show structures of the airbag device according to the first embodiment of the present invention. Specifically, FIG. 6A corresponds to a cross section along the A1-A1 direction shown in FIG. 5A. FIG. 6B corresponds to a cross section along the A2-A2 direction shown in FIG. 5A. FIG. 6C corresponds to a cross section along the A3-A3 direction shown in FIG. 5A. FIGS. 7A and 7B are plane views that respectively show a state prior to a compression of the airbags 34 and 36. FIG. 7A corresponds to the plane view when viewed from an inside (the occupant side). FIG. 7B corresponds to the plane view when viewed from an outside (an opposite side of the occupant). In FIG. 7B, a baffle plate 134c, which is provided inside of the first chamber, is located along a front outer periphery of the second chamber 36. The baffle plate 134c will be explained in detail later.

As shown in FIG. 5A, the airbags 34 and 36 are configured with the first chamber 34 that is deployed toward the vehicle front side of the side support part 12 and the second chamber 36 that is deployed at an inward side than the first chamber 34 in the vehicle width direction. As shown in FIGS. 6A, 6B, and 6C, basically, the second chamber 36 is deployed so as to overlap with the frame sidewall portion 10a when viewed from the vehicle side (in the vehicle width direction). On the other hand, the first chamber 34 is deployed so as not to overlap with the frame sidewall portion 10a when viewed from the vehicle side (in the vehicle width direction).

The first chamber 34 is configured with a front chamber 34F that is positioned ahead and has a relatively small capacity and a rear chamber 34R that is positioned backward and has a relatively large capacity. As shown in FIG. 6B, the front chamber 34F and the rear chamber 34R are fluidly communicated with each other via internal vent holes (vents) V34c and V34d. Thus, the inflation gas flows from the rear chamber 34R to the front chamber 34F. Further, as shown in FIG. 5B, exhaust vent holes (vents) V34a and V34b for exhausting the gas to the outside are provided at the front end part of the front chamber 34F.

As explained above and shown in FIGS. 6A, 6B, and 6C, the airbags 34 and 36 are configured with the first chamber 34 and the second chamber 36. Specifically, the first chamber 34 is deployed toward the vehicle front side of the side support part 12 of the seat. The second chamber 36 houses the inflator 30 and starts to be deployed at the inward side than the first chamber 34 in the vehicle width direction prior to the deployment of the first chamber 34. Further, as shown in FIGS. 5A, 6A, and 6C, internal vent holes (vents) V1 and V2 are provided at a partition portion (a border region) between the first chamber 34 and the second chamber 36. The inflation gas flows from the second chamber 36 to the first chamber 34 via the internal vent holes V1 and V2.

As explained above and shown in FIGS. 6A, 6B, and 6C, the second chamber 36 is deployed so as to overlap with the frame sidewall portion 10a when viewed from the vehicle side (in the vehicle with direction). In this case, the second chamber 36 is securely deployed toward the center side of the seat while the frame sidewall portion 10a receives the reaction force at the time of the deployment of the second chamber 36. Even after the completion of the deployment, the frame sidewall portion 10a receives the pressure from the occupant. As a result, it becomes possible to securely restrain the occupant with respect to the center of the seat. On the other hand, the first chamber 34 is deployed so as not to overlap with the frame sidewall portion 10a when viewed from the vehicle side (in the vehicle with direction). As a result, the first chamber 34 can be promptly and smoothly deployed without the hindrance of the deployment by the side frame 10 (including the frame sidewall 10a) and the second chamber 36.

As shown in FIGS. 7A and 7B, the second chamber 36 can be divided into an upper region 36U, a lower region 36L, and a middle region 36M that is positioned between the upper region 36U and lower region 36L. Further, it is configured that at least one of the upper region 36U or the lower region 36L protrudes toward the vehicle front side than the middle region 36M when the second chamber 36 is deployed. Further, in this embodiment, it is configured that both the upper region 36U and the lower region 36L protrude toward the vehicle front side than the middle region 36M when the second chamber 36 is deployed. However, another embodiment can also be adopted. Specifically, only one of the upper region 36U and the lower region 36L protrudes toward the vehicle front side than the middle region 36M when the second chamber 36 is deployed according to, for example, a shape of the first chamber 34.

In the present embodiment, the second chamber 36 can be U-shaped or C-shaped in which the middle region 36M is recessed backwardly (toward the vehicle rear side) when viewed from the occupant side. When the airbag is deployed, because the upper region 36U of the second chamber 36 is positioned in the vicinity of (proximately at) a head of the occupant, the head in which the damage is easily caused can be promptly restrained. Further, because the lower region 36L is positioned in the vicinity of (proximately at) a waist of the occupant, the waist that is close to a center of gravity of the body of a human being is pushed. As a result, the restraining function for the occupant is improved in the initial stage on the occurrence of an accident.

The front end parts of the upper region 36U and the lower region 36L of the second chamber 36 are configured to substantially correspond to (align with) a front end part of the first chamber 34 when the first and second chambers 34 and 36 are deployed. In this case, there is an advantage that because the airbag including the first chamber 34 and the second chamber 36 has an integrated structure, the deployment shape of the entire airbag becomes stable.

Figure 13A:
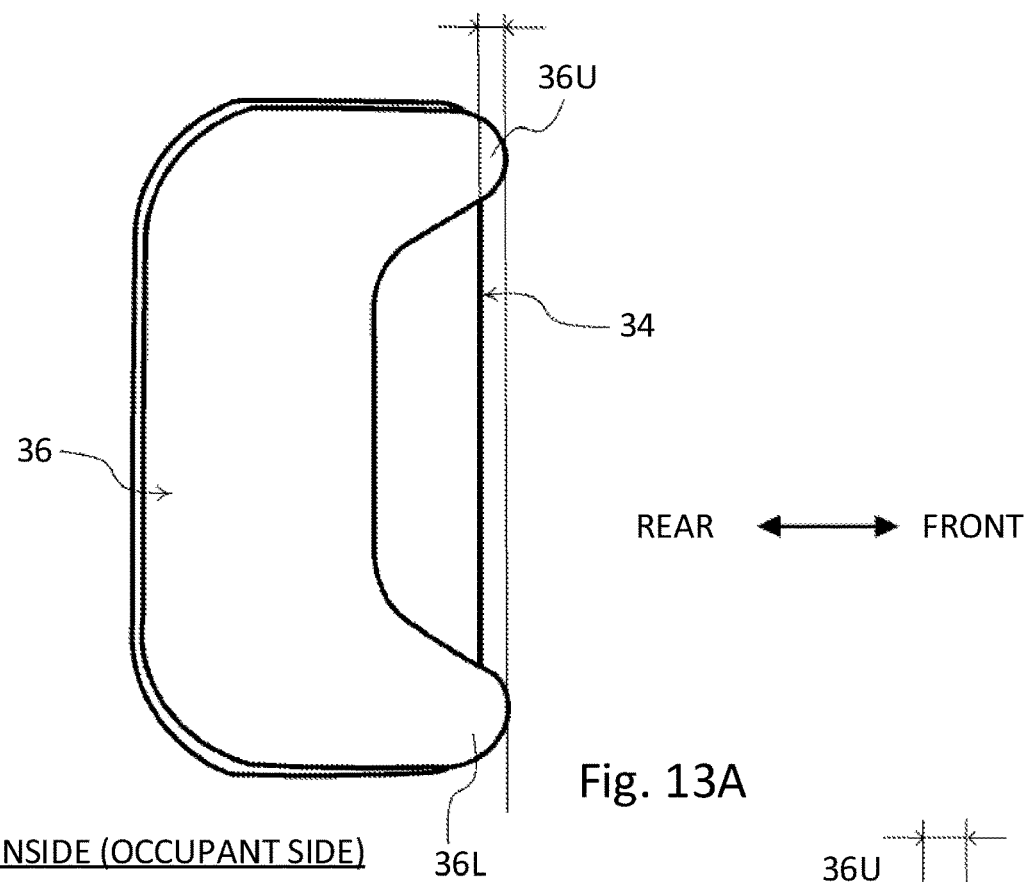
FIGS. 13A and 13B are plane views that respectively show a variation according to another embodiment of the present invention.

Further, as shown in FIG. 13A, it is also possible that the front end parts of the upper region 36U and the lower region 36L of the second chamber 36 are configured to protrude forward (be closer to the vehicle front side) than the front end part of the first chamber 34 when the first and second chambers 34 and 36 are deployed. In this case, it becomes possible that wide areas of the head and the waist of the occupant are securely restrained by the second chamber 36 in the initial stage of the deployment of the airbag.

Figure 13B:
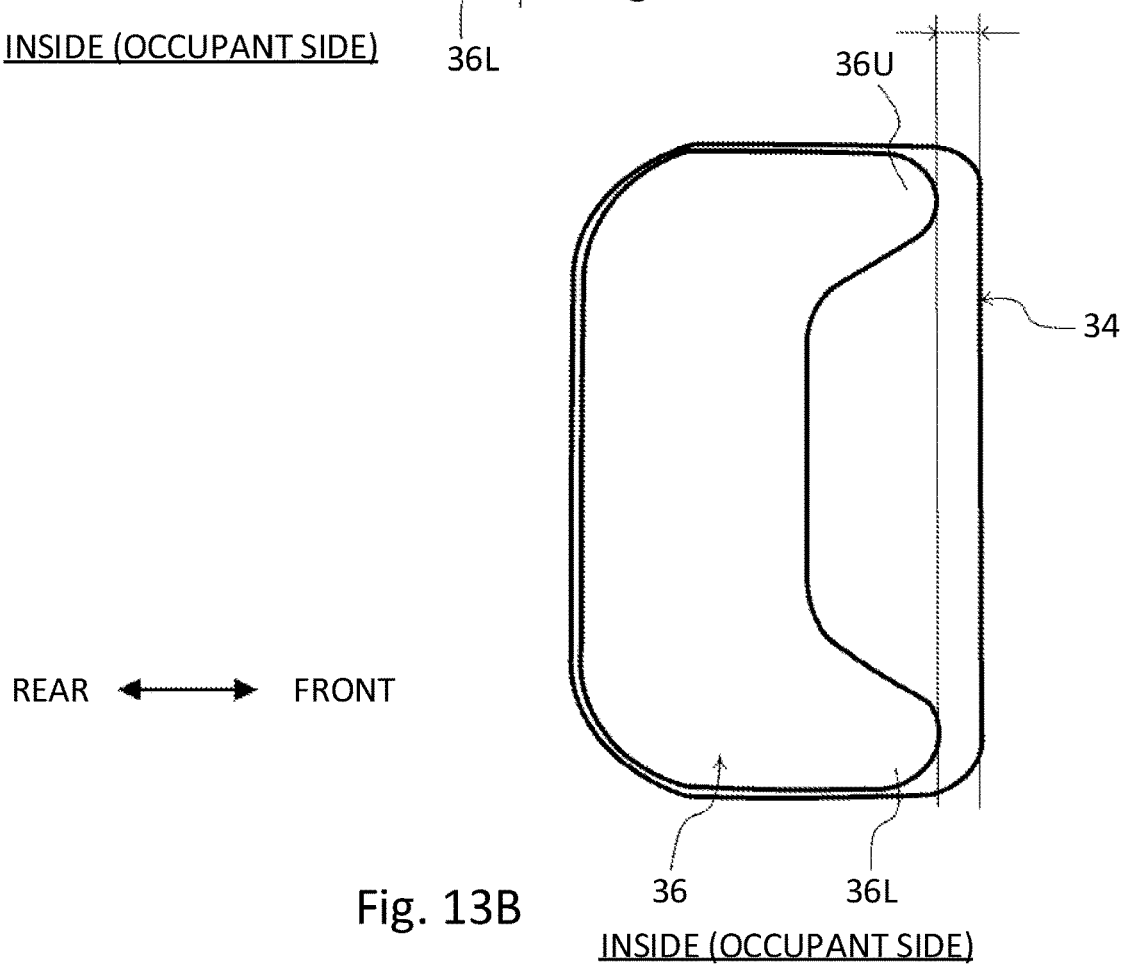

Alternatively, as shown in FIG. 13B, it is possible that the front end part of the first chamber 34 is configured to protrude forward (be located closer to the vehicle front side) than the front end parts of the upper region 36U and the lower region 36L of the second chamber 36 when the first and second chambers 34 and 36 are deployed. In this case, because a capacity of the second chamber 36 becomes relatively small, the gas in the second chamber 36 promptly flows into the first chamber 34. As a result, a prompt deployment of the first chamber 34 can be promoted.

Referring to FIGS. 7A and 7B again, in regards to the first chamber 34 and the second chamber 36, the upper ends and the lower ends are configured to substantially correspond to (align with) each other. By having the shape and configuration explained above, there is an advantage that the shape and the deployment behavior of the entire airbag including the first chamber 34 and the second chamber 36 become stable.

Figure 8:
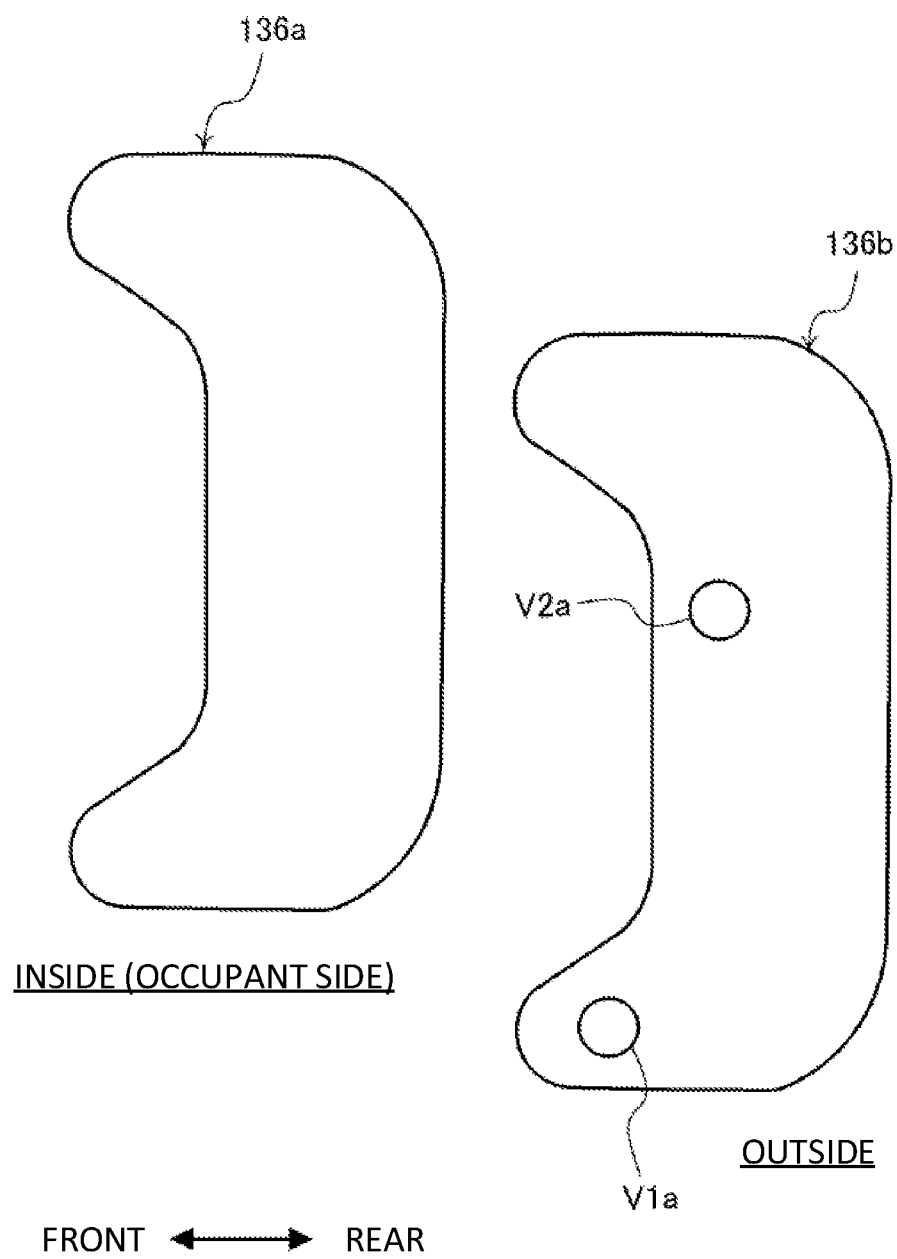
FIG. 8 is a plane view that shows a panel structure. The panel structure configures a second chamber of an airbag being used for a side airbag device according to the first embodiment of the present invention.

FIG. 8 is a plane view that shows a panel structure that configures the second chamber 36. The second chamber 36 can be manufactured by overlapping two (inner and outer) panels 136a and 136b that have the same shape and sewing peripheries of the two panels 136a and 136b together. As explained above, by using two panels being shaped into the upper region 36U and the lower region 36L in advance, the second chamber 36 can be easily manufactured.

In regards to the second chamber 36, two vent holes V1a and V2a are formed in the outer panel 136b that is connected to the first chamber 34. The vent hole V1a is formed at a position corresponding to the lower region 36L. Further, the vent hole V2a is formed at a position corresponding to the middle region 36M. As explained above, because the vent holes V1a and V2a are dispersedly positioned (spaced apart from each other), the flow of the inflation gas from the second chamber 36 to the first chamber 34 becomes smooth.

FIGS. 9A and 9B are plane views that show a panel structure that configures the first chamber 34. The first chamber 34 can be manufactured by overlapping two (inner and outer) panels 134a and 134b that have the same shape and sewing peripheries of the two panels 134a and 134b together. Further, two vent holes V1b and V2b are formed in the inner panel 134a that is connected to the second chamber 36. These vent holes V1b and V2b respectively correspond to the vent holes V1a and V2a (refer to FIG. 8) in the second chamber 36. The internal vent holes V1 and V2 (refer to FIG. 5A) are formed by sewing the circumferences of the overlapped vent holes V1a/V1b and V2a/V2b together.

A baffle plate 134c that extends along a vertical direction is connected to areas of the two panels 136a and 136b that is indicated by a broken line. As a result, as shown in FIGS. 5A, 5B, 6B, and 6C, the first chamber 34 is divided into the front chamber 34F and the rear chamber 34R via the baffle plate 134c.

Figure 10A:
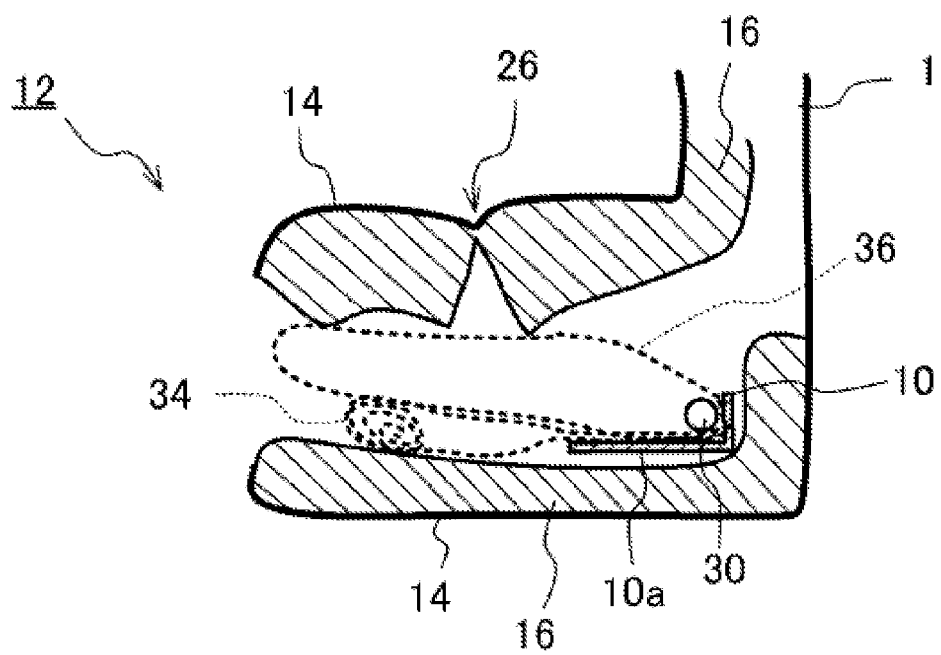
FIGS. 10A and 10B are schematic views (cross sectional views) that respectively show a deploying state of an airbag of a side airbag device according to the first embodiment of the present invention.
Figure 10B:
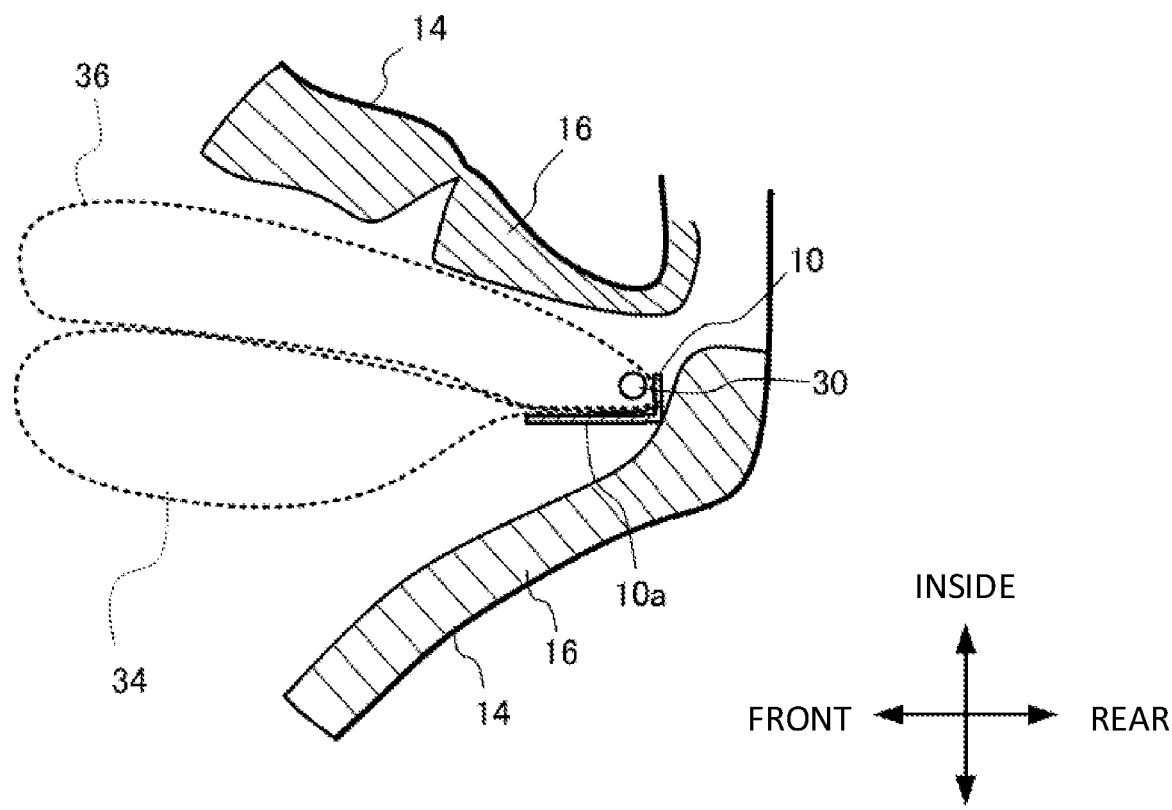

FIGS. 10A and 10B are schematic views (cross sectional views) that respectively show a deploying state of the airbag(s) (chambers) of the airbag device 20 according to the first embodiment of the present invention. FIG. 10A corresponds to a state in an initial stage of the deployment. FIG. 10B corresponds to a state in a late stage of the development. As shown in FIG. 10A, with respect to the first embodiment according to the present invention having the configurations explained above, the second chamber 36 is deployed inside the side support part 12 in the initial stage of the operation of the airbag device 20. Because the second chamber 36 is deployed, the seam (sewn part) 18 (See FIG. 4) located at the vehicle front side of the seat cover 14 for the side support part 12 is torn and open. Because the seam 18 is torn and open, a tip part of the side support part 12 is bent or is deformed by protruding toward the compartment side (the occupant) with respect to the starting point region 26 as a bending origin. As a result, the occupant is restrained while the occupant is pushed toward the inward side in the vehicle width direction.

Because the front side part of the side support part 12 is deformed by protruding toward a side of the occupant due to the deployment of the second chamber 36, the generation of a force for pushing the occupant from a back of the occupant toward a slanting front side can be avoided or can be minimally suppressed. Thus, it becomes possible that the movement of the occupant toward a direction in which the seat belt is pulled out is avoided. That is, injuriousness (dangerousness) to the occupant can be suppressed and the restraining function can be maximally performed.

Next, as shown in FIG. 10B, when the airbags 34 and 36 are further expanded, the first chamber 34 is fully deployed toward the vehicle front side. As a result, the expanded and deployed airbags (chambers 34 and 36) securely protect the occupant when a vehicle accident and/or collision occurs.

In the present embodiment, as shown in FIGS. 5B and 7A, because the second chamber 36 is configured with the upper region 36U and the lower region 36L that are protruded forward (toward the vehicle front side), it becomes possible that the head and the waist of the occupant are restrained at an early stage after the airbag device starts its operation. Further, there is the advantage that while the capacity expansion of the second chamber 36 is minimally suppressed, the entire shape of the airbag can be secured in the initial stage of the deployment.

Figure 11:
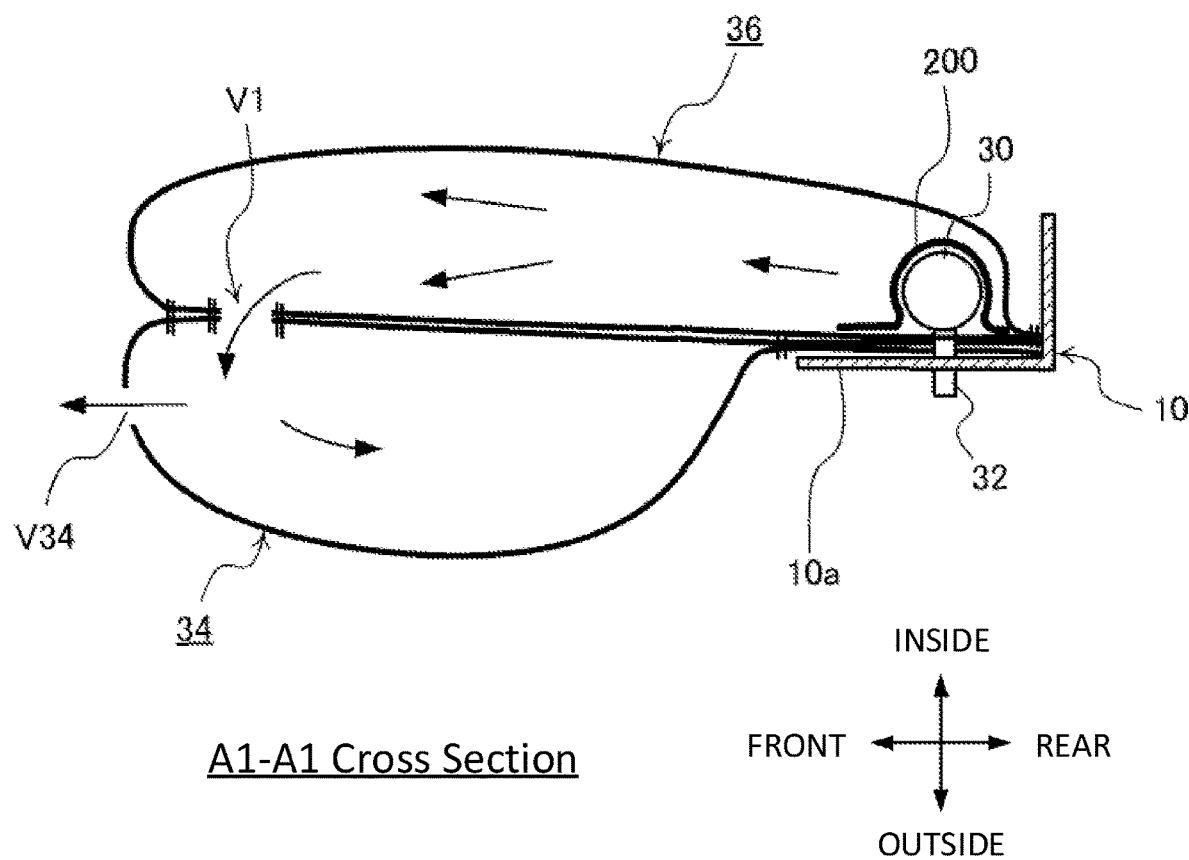
FIG. 11 is a schematic view (cross-sectional view) that shows a deploying state of an airbag of a side airbag device according to a second embodiment of the present invention.

FIG. 11 is a schematic view (cross sectional view) that shows a deploying state of an airbag of a side airbag device according to a second embodiment of the present invention. FIG. 11 corresponds to a cross section along the A1-A1 direction shown in FIG. 5A. FIGS. 12A and 12B are plane views that respectively show a state prior to a compression of the airbag being used for the side airbag device according to the second embodiment of the present invention. FIG. 12A corresponds to the plane view when viewed from an inside (the occupant side) in the vehicle width direction. FIG. 12B corresponds to the plane view when viewed from an outside (an opposite side of the occupant) in the vehicle width direction. Because the second embodiment has many parts in common with the first embodiment, the redundant explanations with respect to the same or corresponding configurations are omitted but the same reference numerals are used for labeling. Therefore, the important features and differences will be mainly explained below.

In the present embodiment, for instance, a tubular rectifying member 200 is provided inside of the second chamber 36. The rectifying member 200 encircles (surrounds) an inflator 30 and regulates a flow of the inflation gas from the inflator 30. As a result, the flow of the inflation gas into the second chamber 36 can be controlled by the rectifying member 200. Further, in particular, openings, which guide the inflation gas being discharged from the inflator 30 in up-and-down directions (vertical direction), are provided at upper and lower parts of the rectifying member 200, the gas can be promptly supplied to the upper region 36U and the lower region 36L of the second chamber 36.

The present invention has been explained in terms of the exemplary embodiments, however, it will be apparent that the same may be varied or deformed by this disclosure to one of ordinary skill in the art. Therefore, it is considered that the exemplary embodiments of the present invention explained above are exemplary, but not limited. Such variations are not to be regarded as a departure from the spirit and scope of the invention, are intended to be included within the scope of the following claims. For instance, in the exemplary embodiments discussed above, the side airbag device 20 located at a near side (of a seat surface of a vehicle seat that is close to a vehicle door when observed from an outside in a vehicle width direction) is intensively explained. However, it is possible that the same or similar configurations explained in the embodiments can be used for such as a side airbag located at a far side (a seat surface on a further side of a vehicle seat from a vehicle door in a vehicle width direction), and a single-seat vehicle of such as a very small vehicle (a small mobility etc.) (a vehicle including the part that has only one seat in a row with or without a door).

What is claimed is:

1. A vehicle seat comprising:
   a seat cushion having a seat surface;
   a seat back including a backrest, the seat back having a side support at a side thereof in a vehicle width direction, the side support expanding toward a vehicle front side in a vehicle travel direction;
   a frame sidewall disposed inside the side support, the frame sidewall extending along the vehicle travel direction in a horizontal cross-sectional view; and
   a side airbag device including:
      an airbag disposed inside the side support, the airbag being configured to restrain an occupant by inflating and deploying the airbag; and
      an inflator provided at an inner side of the frame sidewall in the vehicle width direction, the inflator configured to supply an inflation gas to the airbag,
   wherein the airbag has:
      a first chamber configured to be deployed toward the vehicle front side;
      a second chamber in which the inflator is disposed, the second chamber is configured to start to be deployed at an inward side prior to deployment of the first chamber in the vehicle width direction, the second chamber including upper, middle, and lower regions along a vertical direction, and the middle region is sandwiched between the upper and lower regions;
      an inner vent hole disposed in a partition between the first and second chambers, the inner vent hole allowing a flow of the inflation gas from the second chamber to the first chamber, and
      a baffle plate provided inside the first chamber, the baffle plate extending in the vertical direction and dividing the first chamber into a front chamber portion and a rear chamber portion, the baffle plate aligned in a lateral direction that is perpendicular to the vehicle travel direction with a front outer periphery of the second chamber,
   wherein the upper region and the lower region are configured to protrude farther toward the vehicle front side than the middle region upon deployment of the second chamber, and
   wherein the second chamber has a configuration selected from a group consisting of U-shape and a C-shape in the which the middle region is recessed toward a vehicle rear side in a vehicle travel direction and the baffle has a corresponding configuration upon deployment of the second chamber.

2. The vehicle seat according to claim 1, further comprising at least one additional inner vent hole disposed in the partition between the first and second chambers.

3. The vehicle seat according to claim 1, wherein the baffle plate is formed by two overlapping panels of the airbag, the baffle plate provided proximately at a middle of the first chamber in the vehicle travel direction and extending along the vertical direction, and peripheries of the two overlapping panels are sewn together so as to section the first chamber into the front and rear chamber portions.

4. The vehicle seat according to claim 1, wherein a front end of the first chamber is located closer to the vehicle front side than front ends of the upper and lower regions of the second chamber when the first and second chambers are deployed.

5. The vehicle seat according to claim 1, further comprising:
   a rectifying member that is located inside the second chamber to surround the inflator, the rectifying member being configured to regulate a flow of the inflation gas.

6. The vehicle seat according to claim 5, wherein the rectifying member has first and second openings therein located at upper and lower parts of the rectifying member, respectively, and
   the first and second openings guide the inflation gas in up and down directions, respectively.

7. The vehicle seat according to claim 1, wherein the second chamber is configured by overlapping two panels that have a same configuration and sewing peripheries of the two panels together.

8. The vehicle seat according to claim 1, wherein upper and lower ends of the first chamber approximately align with upper and lower ends of the second chamber in the vertical direction, respectively.

9. The vehicle seat according to claim 1, wherein the second chamber overlaps the frame sidewall in the vehicle width direction upon deployment, and
   the first chamber is configured to be deployed without overlapping the frame sidewall in the vehicle width direction.

* * * * *